United States Patent Office 3,398,137
Patented Aug. 20, 1968

3,398,137
2-METHYLSULPHONYL-4-NITRO-2'-ACYLAMINO-4'-DIALKYLAMINO-1,1'-AZOBENZENE DYES
Curt Mueller, Basel, Basel-Stadt, Switzerland, assignor to Sandoz Ltd. (also known as Sandoz AG), Basel, Switzerland
No Drawing. Continuation-in-part of application Ser. No. 344,538, Feb. 13, 1964. This application June 21, 1967, Ser. No. 647,640
Claims priority, application Switzerland, Feb. 15, 1963, 1,945/63
10 Claims. (Cl. 260—207)

ABSTRACT OF THE DISCLOSURE

Disperse dyes of the 2-methylsulphonyl-4-nitro-2'-acylamino-4'-dialkylamino-1,1'-azobenzene series build up excellently from aqueous dispersion on textile materials made of fully synthetic or semi-synthetic hydrophobic high molecular organic substances. Resulting dyeings are extremely fast to thermofixation, sublimation, pleating, gas fumes, cross-dyeing, dry cleaning, chlorine, water, washing and perspiration.

---

This application is a continuation-in-part of application Ser. No. 344,538 filed Feb. 13, 1964, and now U.S. Patent No. 3,342,804.

This invention relates to dyes of the formula

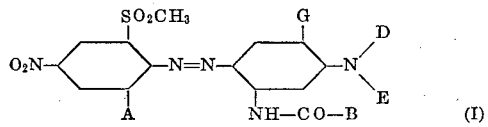

wherein A represents a hydrogen, chlorine or bromine atom, B represents an alkyl radical having 1 to 3 carbon atoms, which is substituted by a chlorine or bromine atom, a cyano, acetyl, benzoyl or low molecular alkoxy radical, D represents a low molecular alkyl radical, E represents a low molecular alkyl radical and G represents a hydrogen atom or a methyl, ethyl, methoxy or ethoxy group.

The term "low molecular" designates radicals having 1, 2, 3 or 4 carbon atoms.

These dyes are produced by coupling a diazotized amine of the formula

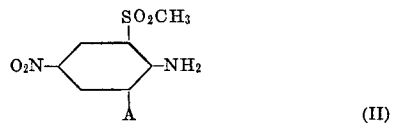

with a compound of formula

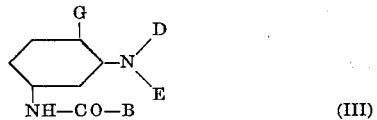

In general, the coupling reaction is conducted in an acid, if necessary buffered medium, with cooling, for example at temperatures between 0° and 5° C.

Applied from aqueous dispersion, these dyes build up excellently on textile materials made of fully synthetic or semi-synthetic hydrophobic high-molecular substances. They are especially suitable for the dyeing, padding and printing of filaments, fibers, fleeces, knitted fabrics and woven fabrics made of linear aromatic polyesters, secondary cellulose acetate, or cellulose triacetate. Synthetic polyamides, polyolefins and acrylonitrile polymerisation products can also be dyed with the dyes. Dyeings of high quality are obtained on linear aromatic polyesters. These are generally polycondensation products of terephthalic acid and glycols, notably ethylene glycol.

It is of great advantage to convert the dyes into dyeing preparations by one of the known methods before they are applied to the textile material. For this purpose they are ground to an average particle size of approximately 0.01 to 10 microns or preferably about 0.1 to 5 microns. Grinding can be carried out in the presence of dispersing agents or filling agents. For example, the dried dye can be ground with a dispersing agent, if necessary in the presence of filling agents, or it can be kneaded in paste form with a dispersing agent and dried in a vacuum or jet drier. The preparations obtained in this way, on the addition of a suitable volume of water, are useful for dyeing from so-called long baths, for padding or for printing.

For dyeing in long baths amounts of dye up to about 100 grammes per liter are generally used, for padding up to about 150 grammes per liter, or preferably 0.1 to 100 grammes and for printing up to about 150 grammes per kilogramme of printing paste. The liquor ratio can vary within wide limits, e.g. from about 1:3 to 1:200 or preferably between 1:3 and 1:80.

The known dyeing methods are used for the dyes. Polyester fibers can be dyed in the presence of carriers at temperatures from about 80° to 125° C., or in the absence of carriers at about 100° to 140° C. under pressure by the exhaustion process. The dyes can be padded on these fibers from aqueous dispersion or printed with an aqueous paste, and fixed at temperatures between 140° C. and 230° C., e.g. with the aid of water vapour or air. In the optimum temperature range 180° to 220° C. the dyes diffuse rapidly into the polyester fiber and do not sublime even when the fiber is exposed to these high temperatures for some length of time. This eliminates the inconvenience caused by contamination of the fixing plant by sublimed dye. Secondary cellulose acetate is dyed preferably at temperatures between about 65° and 80° C. and cellulose triacetate at temperatures up to about 115° C. The optimum pH range is 2 to 9 or more particularly 4 to 8.

In most cases one of the dispersing agents in general use is added to the dye-bath; these are preferably anionic or non-ionic and may be employed in mixture with each other. Approximately 0.5 gramme dispersing agent per liter of the dyeing medium is often sufficient, but larger amounts, e.g. to about 3 grammes per liter, can be used.

The dyeings and prints obtained are extremely fast to thermofixation, sublimation, pleating, gas fumes, cross dyeing, dry cleaning, chlorine, and to wet treatments, e.g. water, washing and perspiration. They are well dischargeable and the reserve of cotton and wool is good. The light fastness is outstanding even in pale shades, which makes the new dyes highly suitable as components for combination dyeings in fashionable pastel shades. The dyes are stable to boiling and reduction at temperatures up to 220° C. and in particular within the range 80° to 140° C. This stability is not adversely affected either by the liquor ratio or by the presence of agents accelerating the dyeing process.

In the following examples the parts are by weight and the temperatures in degrees centigrade.

Example 1

6.9 parts of powdered sodium nitrite are added slowly with thorough stirring to 120 parts of concentrated sulfuric acid at 60–70°. After stirring for another 10 minutes at 60° and cooling to 10°, 100 parts of glacial acetic acid are added at 15–25°, followed by 25 parts of 1-amino-2-methylsulfonyl-4-nitrobenzene and 100 parts of glacial acetic acid. Stirring is continued for 2 hours at 10°, then 8 parts of urea are added. After 10 minutes the diazonium salt solution is poured into a mixture of 24 parts of 3-diethylamino - 1-chloroacetylaminobenzene, 20 parts of concentrated hydrochloric acid and 150 parts of ice. The coupling reaction is completed at 0° in acid medium. The dye formed is filtered off, washed free of acid and dried. It dyes synthetic fibers in brilliant violet shades with good fastness properties.

Example 2

6.9 parts of powdered sodium nitrite are added with vigorous stirring to 150 parts of concentrated sulphuric acid at 60–70°, and after 10 minutes 25 parts of 1-amino-2-methylsulphonyl - 4 - nitro-6-chlorobenzene are added. Stirring is continued for 1 hour at 60° and the mixture then cooled to 0°. The diazonium salt solution formed is run into a mixture of 27 parts of 1-chloroacetyl-3-diethylamino-4-methoxybenzene, 100 parts of glacial acetic acid and 100 parts of ice. The coupling reaction is completed at 0° in an acid, if necessary buffered medium. The dye obtained is filtered off, washed with water until free of acid and dried. It dyes synthetic fibers in blue shades with excellent fastness properties.

Example 3

6.9 parts of powdered sodium nitrite are added slowly with thorough stirring to 120 parts of concentrated sulfuric acid at 60–70°. After stirring for another 10 minutes at 60° and cooling to 10°, 100 parts of glacial acetic acid are added at 15–25°, followed by 25 parts of 1-amino-2-methylsulfonyl-4-nitrobenzene and 100 parts of glacial acetic acid. Stirring is continued for 2 hours at 10°, then 8 parts of urea are added. After 10 minutes the diazonium salt solution is poured into a mixture of 29.8 parts of 3-diethylamino - 4 - ethoxy-1-(β-chloropropionyl)-aminobenzene, 50 parts of glacial acetic acid and 200 parts of ice. The coupling reaction is completed at 0° in acid medium. The dye formed is filtered off, washed free of acid and dried. It dyes synthetic fibers in blue shades with good fastness properties.

The dyestuffs listed in the following table are produced in the same manner as given in the preceding examples.

TABLE

| Example No. | A | B | D | E | G | Shade on Polyester fibers |
|---|---|---|---|---|---|---|
| 4 | H | —CHCl—CH$_3$ | —C$_2$H$_5$ | —C$_2$H$_5$ | H | Violet. |
| 5 | Cl | —CH$_2$—CH$_2$Br | —C$_2$H$_5$ | —C$_2$H$_5$ | H | Do. |
| 6 | Br | —CH$_2$—CH$_2$Br | —C$_2$H$_5$ | —C$_2$H$_5$ | H | Do. |
| 7 | H | —CH$_2$—CH$_2$Cl | —CH$_3$ | —CH$_3$ | —OC$_2$H$_5$ | Blue. |
| 8 | Cl | —CH$_2$—CH$_2$Cl | —C$_3$H$_7$ | —C$_3$H$_7$ | H | Violet. |
| 9 | Br | —CH$_2$—CH$_2$Cl | —CH$_3$ | —CH$_3$ | —CH$_3$ | Do. |
| 10 | Br | —CH$_2$CN | —C$_2$H$_5$ | —C$_2$H$_5$ | —C$_2$H$_5$ | Do. |
| 11 | Br | —CH$_2$—CO—C$_6$H$_5$ | —C$_2$H$_5$ | —C$_2$H$_5$ | H | Do. |
| 12 | Cl | —CHCl—CO—C$_6$H$_5$ | —C$_2$H$_5$ | —C$_2$H$_5$ | H | Do. |
| 13 | H | —CH$_2$—O—C$_2$H$_5$ | —C$_2$H$_5$ | —C$_2$H$_5$ | H | Do. |
| 14 | Cl | —CH$_2$—O—CH$_3$ | —C$_2$H$_5$ | —C$_2$H$_5$ | H | Do. |
| 15 | H | —CH$_2$—CH$_2$Cl | —C$_2$H$_5$ | —C$_2$H$_5$ | H | Do. |
| 16 | H | —CHCl—CH$_3$ | —C$_2$H$_5$ | —C$_2$H$_5$ | H | Do. |
| 17 | Cl | —CH$_2$—CO—CH$_3$ | —C$_2$H$_5$ | —C$_2$H$_5$ | H | Do. |
| 18 | H | —CHCl—CO—CH$_3$ | —C$_2$H$_5$ | —C$_2$H$_5$ | H | Do. |

Formulae of representative dyes of the foregoing examples are as follows:

Example 2

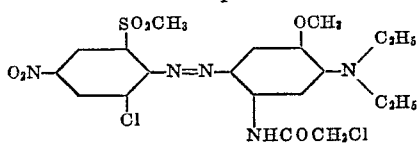

Example 15

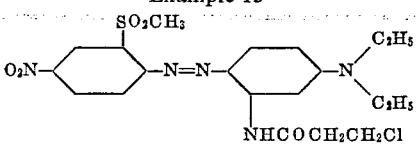

Example 16

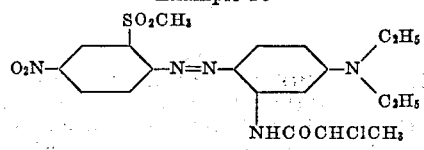

Having thus disclosed the invention what we claim is:

1. A dye of the formula

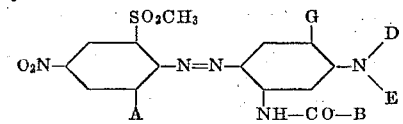

wherein
A is a member selected from the group consisting of hydrogen, chloro and bromo;
B is an alkyl having from 1 to 3 carbons which is substituted by at least one member selected from the group consisting of chloro, bromo, cyano, acetyl, benzoyl and lower alkoxy;
D is lower alkyl;
E is lower alkyl; and
G is a member selected from the group consisting of hydrogen, methyl, ethyl, methoxy and ethoxy.

2. A dye according to claim 1 wherein B is chloroalkyl.
3. A dye according to claim 1 wherein B is cyanoalkyl.
4. A dye according to claim 1 wherein B is acetylalkyl.
5. A dye according to claim 1 wherein B is benzoylalkyl.
6. A dye according to claim 1 wherein B is lower alkoxyalkyl.
7. A dye according to claim 1 wherein B is bromoalkyl.
8. The dye according to claim 2 of the formula

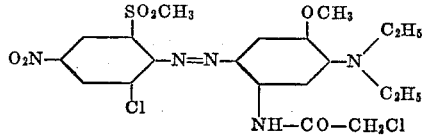

9. The dye according to claim 2 of the formula

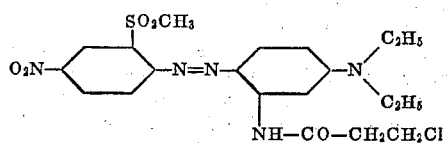

10. The dye according to claim 2 of the formula
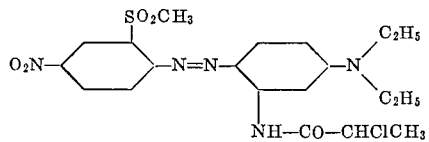
References Cited
UNITED STATES PATENTS
2,111,300  3/1938  Senn _____ 260—207.1 XR
2,873,270  2/1959  Merian _____ 260—205
FLOYD D. HIGEL, *Primary Examiner.*